United States Patent
Ramaswamy et al.

(10) Patent No.: US 7,643,090 B2
(45) Date of Patent: Jan. 5, 2010

(54) METHODS AND APPARATUS TO DISTINGUISH A SIGNAL ORIGINATING FROM A LOCAL DEVICE FROM A BROADCAST SIGNAL

(75) Inventors: Arun Ramaswamy, Tampa, FL (US); Dan Nelson, Tampa, FL (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 0 days.

(21) Appl. No.: 10/596,858

(22) PCT Filed: Dec. 10, 2004

(86) PCT No.: PCT/US2004/041670

§ 371 (c)(1),
(2), (4) Date: Feb. 2, 2007

(87) PCT Pub. No.: WO2005/065159

PCT Pub. Date: Jul. 21, 2005

(65) Prior Publication Data

US 2007/0211170 A1    Sep. 13, 2007

Related U.S. Application Data

(60) Provisional application No. 60/533,190, filed on Dec. 30, 2003.

(51) Int. Cl.
*H04N 5/46* (2006.01)
*H04H 60/32* (2008.01)

(52) U.S. Cl. .................. 348/558; 348/180; 725/14; 725/18; 725/20

(58) Field of Classification Search .............. 348/180, 348/738, 722, 552–558, 705, 706; 725/9, 725/14–21
See application file for complete search history.

(56) References Cited

U.S. PATENT DOCUMENTS

| 5,548,346 | A | * | 8/1996 | Mimura et al. ............. 348/738 |
| 5,880,788 | A | * | 3/1999 | Bregler ..................... 348/515 |
| 6,067,126 | A | * | 5/2000 | Alexander ................ 348/738 |
| 6,766,523 | B2 | | 7/2004 | Herley |
| 2002/0080286 | A1 | | 6/2002 | Dagtas et al. |

OTHER PUBLICATIONS

Submitted herewith is the International Preliminary Report on Patentability for International Application No. PCT/US04/41670, dated on Aug. 15, 2006, 4 pages.
International Search Report for International Application No. PCT/US04/41670, mailed Mar. 21, 2006, 2 pages.
Written Opinion of the International Search Authority for International Application No. PCT/US04/41670, mailed Mar. 21, 2006, 2 pages.

* cited by examiner

*Primary Examiner*—M. Lee
(74) *Attorney, Agent, or Firm*—Hanley, Flight & Zimmerman, LLC

(57) ABSTRACT

Methods and apparatus to distinguish a signal originating from a local device from a broadcast signal are disclosed. A disclosed system classifies a video component of an audio-video signal by analyzing a histogram of pixel data, analyzing a quality factor, and/or attempting to detect embedded data in the video component. The disclosed system also classifies an audio component of the audio-video signal by attempting to detect embedded audio data and/or analyzing waveform energy associated with the audio component. A source of the audio-video signal is determined based on the video classification and/or the audio classification.

5 Claims, 7 Drawing Sheets

| 0,0 | 1,0 | ... | N,0 |
|-----|-----|-----|-----|
| 0,1 | 1,1 | ... | N,1 |
| ⋮ | ⋮ | ⋮ | ⋮ |
| 0,N | 1,N | ... | N,N |

METHODS AND APPARATUS TO DISTINGUISH A SIGNAL ORIGINATING FROM A LOCAL DEVICE FROM A BROADCAST SIGNAL

RELATED APPLICATION

This application is a national phase application of PCT patent application serial no. PCT/US2004/041670 the entire disclosure of which is incorporated by reference herein in its entirety, which claims priority from U.S. provisional application Ser. No. 60/533,190, entitled "METHODS AND APPARATUS TO DISTINGUISH A SIGNAL ORIGINATING FROM A LOCAL DEVICE FROM A BROADCAST SIGNAL" and filed Dec. 30, 2003, the entire disclosure of which is incorporated by reference herein in its entirety.

TECHNICAL FIELD

The present disclosure pertains to audience measurement and, more particularly, to methods and apparatus to distinguish a signal originating from a local device from a broadcast signal.

BACKGROUND

Determining television viewing audience size and demographics of programs and program sources (e.g., a television broadcast, a Pay-Per-View program, a recorded program such as a movie on a video cassette, etc.) helps television program producers improve the quality of television programming and determine a price to be charged for advertising broadcast during such programming. In addition, accurate television viewing demographics allow advertisers to target audiences of a desired size and/or audiences including members having a set of common, desired characteristics (e.g., income level, lifestyles, interests, etc.).

To collect viewing statistics and demographics, an audience measurement company may enlist a number of television viewers (e.g., a panel) to cooperate in an audience measurement study for a predefined length of time. The viewing habits of these enlisted viewers or panelists, as well as demographic data about these enlisted viewers, are collected using automated and/or manual collection methods. The collected viewing data is then used to generate a variety of informational statistics related to television viewing audiences including, for example, audience sizes, audience demographics, audience preferences, the total number of hours of television viewing per household and/or per region, etc.

The configurations of automated data collection systems vary depending on the equipment used to receive, process, and display television signals in each home being monitored. For example, homes that receive cable television signals and/or satellite television signals typically include set top boxes (STB) to receive television signals from a cable and/or satellite television provider. Television systems configured in this manner are typically monitored using hardware, firmware, and/or software to interface with the STB to extract or to generate signal information therefrom. Such hardware, firmware, and/or software may be adapted to perform a variety of monitoring tasks including, for example, detecting the channel tuning status of a tuning device disposed in the STB, extracting program identification codes embedded in television signals received at the STB, generating signatures characteristic of television signals received at the STB, etc.

BRIEF DESCRIPTION OF THE DRAWINGS

FIG. 5(a) is an illustration of an example histogram for a television broadcast signal and FIG. 5(b) is an illustration of an example histogram for a television signal generated by a STB.

DETAILED DESCRIPTION

Figure 1:
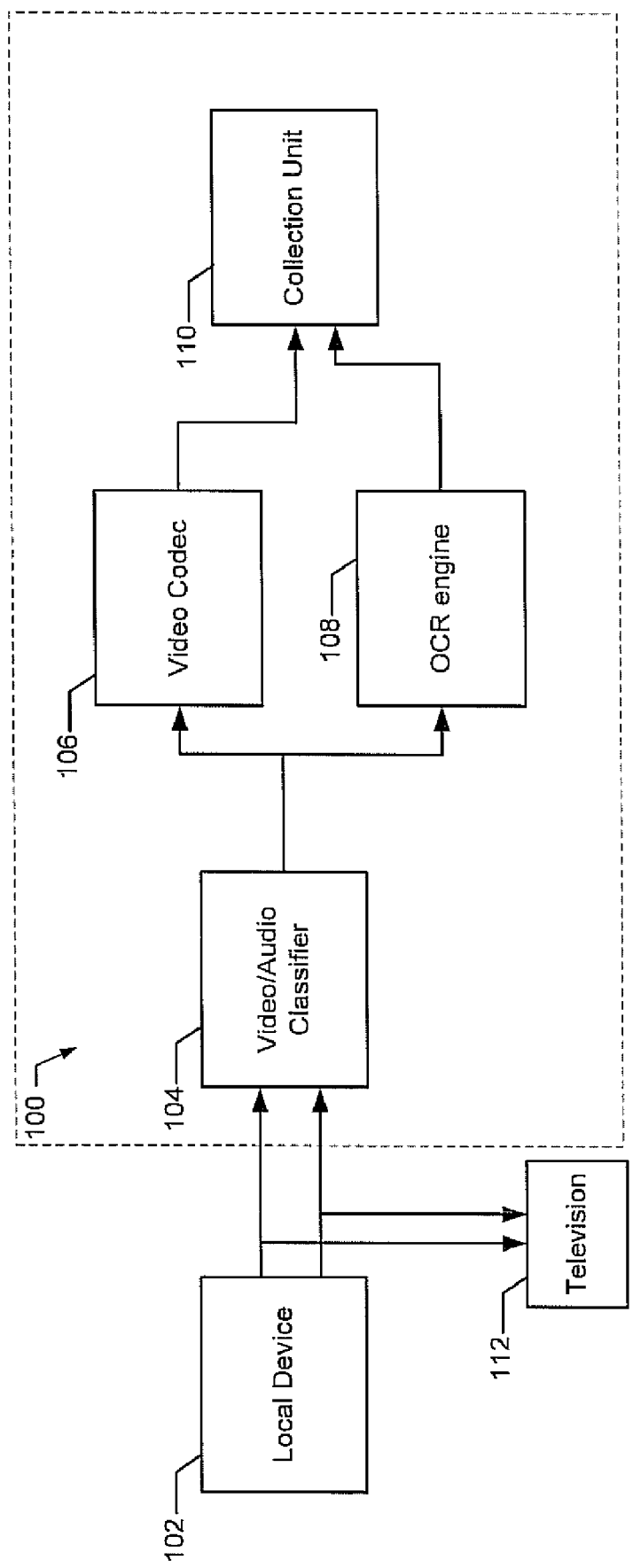
FIG. 1 is a schematic illustration of an example system to monitor a signal of a set top box.

FIG. 1 is a schematic illustration of an example system 100 to distinguish signals generated by a local device 102 such as an STB from broadcast signals received and/or processed by the local device. The example system 100 comprises a video/audio classifier 104, a video codec 106, an optical character recognition engine 108, and a collection unit 110. Although the illustrated system employs an STB as the local device 102, persons of ordinary skill in the art will appreciate that the example system 100 may be used with other types of devices such as video cassette recorders (VCR), digital versatile disc (DVD) players, personal video recorders (PVR) and video game consoles. In addition, devices that integrate the functionality of a video game console, a DVD player, a VCR, a STB and/or a PVR may be used. Thus, it will be understood that although, for ease of discussion, the following description refers to the local device 102 as an STB, STB 102 may be replaced with any device that may generate television signals to be displayed on the television.

The STB 102 of the illustrated example is configured to tune and process television broadcast signals and to output audio-video signals. The audio-video signal output by the STB 102 may be a tuned television broadcast signal and/or may be generated by the STB 102 (e.g., on-screen menus, interactive television (iTV), etc.). The STB 102 may process and/or decode the television broadcast signal before it is output to a device configured to display audio-video signals such as a television 112. In the illustrated example, the signals output to the television 112 are also output to the video/audio classifier 104.

The video/audio classifier 104 is configured to receive the audio-video signal output to the television 112 and to determine the source of the audio-video signal (e.g., to determine whether it is a television broadcast signal or a local signal generated by the STB 102). The video/audio classifier 104 may separate the received television signal into an audio signal and a video signal, or the STB 102 may output a single signal containing both audio and video. Regardless, the audio signal's waveform may be analyzed by the video/audio classifier 104 to determine the source of the received audio signal. The video signal may be digitized and separated into video frames by the STB 102 or the video/audio classifier 104. The video frames may then be analyzed by the video/audio classifier 104 by: (a) creating a histogram and/or histograms to determine different video characteristics (e.g., pixel value distribution, a number of scene changes, etc.), (b) by determining if there is embedded data within the vertical blanking intervals of the video signal, (c) by extracting text characters, and/or (d) by logo detection. The audio analysis and video analysis results are combined and used to determine the source of the audio-video signal. The combined result and the audio-video signal are output from the video/audio classifier 104 to the video codec 106 and the OCR engine 108. One of ordinary skill in the art will recognize that the video/audio classifier 104 may be embodied in separate devices such as a discrete video classifier and a discrete audio classifier.

The video codec 106 is configured to receive the audio-video signal from the video/audio classifier 104. The video codec 106 may decode and/or process the received audio-video signal such that the audio-video signal is viewable on a television and/or other display. The video codec 106 may also be configured to capture screen shots from the received audio-video signal, to compress the captured screen shots, and/or to transmit the captured screen shots to the collection unit 110. The video codec 106 is well known to those of ordinary skill in the art and is not further described here.

The OCR engine 108 is configured to receive the audio-video signal and the combined result from the video/audio classifier 104. If the audio-video signal is identified as having been generated by the STB 102, the OCR engine 108 is configured to extract the on-screen text characters from the audio-video signal. The extracted on-screen text characters may be transmitted to a backend server through the collection unit 110 for further analysis.

The collection unit 110 is configured to receive captured screen shots from the video codec 106 and extracted on-screen text characters from the OCR engine 108. The collection unit 110 may also associate time stamp data with the captured screen shots and/or the extracted on-screen text characters. The collection unit 110 may store the captured screen shots and/or the on-screen text characters for later use or transmission, or may immediately transmit the captured screen shots and/or the on-screen text characters to a central data collection facility or backend server.

Figure 2:
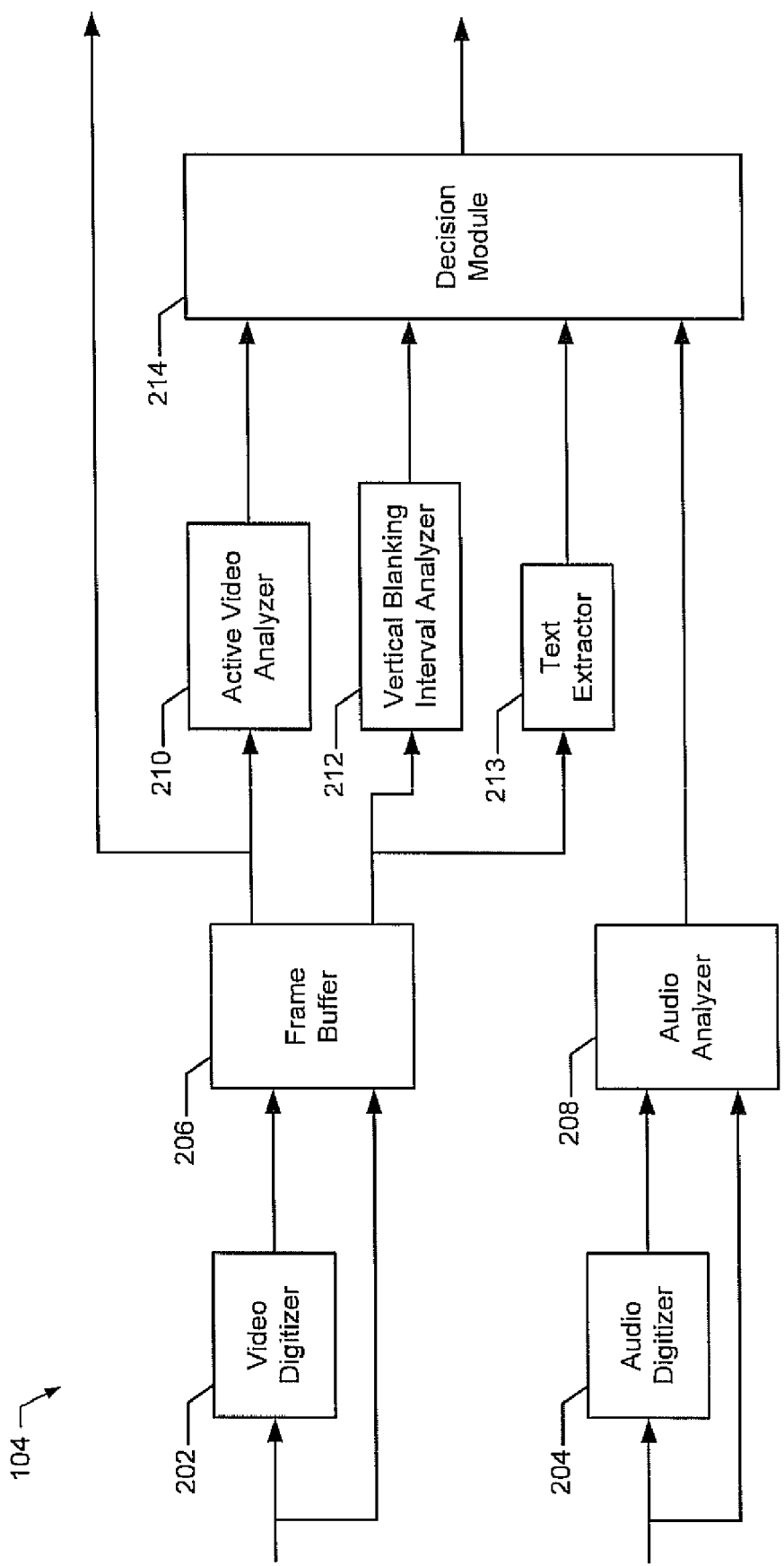
FIG. 2 is a block diagram of an example video/audio classifier to detect video originating from the STB.

FIG. 2 is a block diagram of an example video/audio classifier 104. The example video/audio classifier 104 of FIG. 2 includes a video digitizer 202, an audio digitizer 204, a frame buffer 206, an audio analyzer 208, an active video analyzer 210, a vertical blanking interval analyzer 212, a text extractor 213, and a decision module 214. In practice, the example video/audio classifier 104 may be implemented as several components of hardware, each configured to perform one or more functions, may be implemented in software or firmware in which one or more programs are used to perform the different functions, or may be implemented by a combination of hardware, firmware, and/or software.

The video digitizer 202 is configured to receive an analog video signal from the local device/STB 102 and to capture a video frame or multiple video frames of the video signal. When an analog video signal is received by the video digitizer 202, the video digitizer 202 converts the video frame(s) into a digital representation. The video frame(s) may be converted into a digital representation by using, for example, a conventional frame capture device known to those of ordinary skill in the art. The video frame(s) are stored in the frame buffer 206. If a digital video signal is received, it is passed directly to the frame buffer 206 and is not converted by the video digitizer 202 since no conversion is necessary. If the digital video signal is a compressed digital video signal, the video digitizer 202 may decompress the digital video signal before it is passed to the frame buffer 206.

The frame buffer 206 is configured to receive the digitized analog video signal from the video digitizer 202 and/or a digital video signal directly from the local device/STB 102. The frame buffer 206 may be any form of memory and/or storage device configured to store data. For example, the frame buffer 206 may be implemented by any form of random access memory (RAM), a hard drive, and/or flash memory. Frame buffers 206 are known to persons of ordinary skill in the art and will not be further described here.

The active video analyzer 210 is configured to receive the video frames from the frame buffer 206 and create a histogram of pixel data. To this end, the video frames may be first divided into macroblocks. An example array of macroblocks is shown in FIG. 3.

Figures 3, 5:
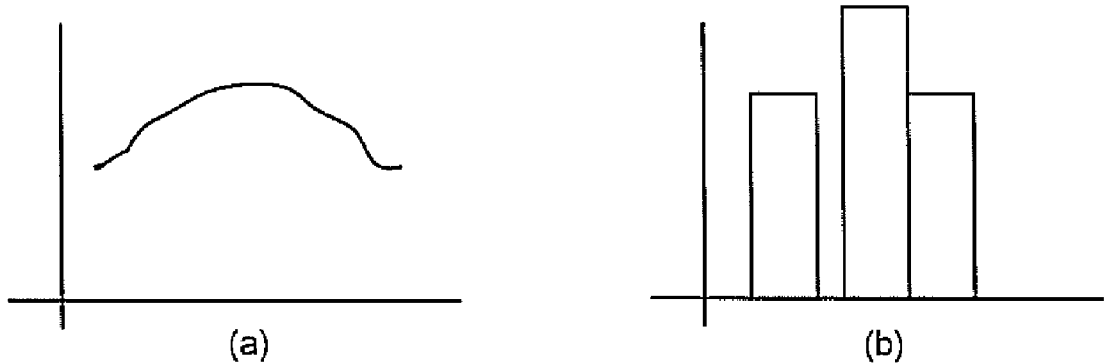
FIG. 3 is an illustration of an example array of macroblocks.

FIG. 3 illustrates an example N×N array of macroblocks. Each macroblock in the array (e.g., macroblock (0,1) or generically referred to as macroblock(i,j)) is a group of M×M pixels (e.g., 16×16) or may be an individual pixel. The N×N array of macroblocks may encompass the entire digital video frame or may encompass regions of the digital video frame such as, but not limited to, corners of the digital video frame (to detect Picture-in-Picture (PiP)) and/or a strip across a portion (e.g., lower half, lower quarter, upper third, etc.) of the digital video frame (to detect on-screen banner guides). By dividing the digital video frame into macroblocks, the detection of STB generated video that effects only a portion of the display is facilitated.

In addition, the arrays of macroblocks may have different grading values associated with them. Grading values may be assigned by the importance or likelihood of determining the source of the television signal from the region the macroblocks cover. For example, if the array of macroblocks encompassed the lower half of the screen where the banner guide may appear, the grading value may be a large value, but if the array of macroblocks encompassed a small section in the middle of the screen, the grading value may be a lower number. By using various grading values in different regions of the digital video frame, types of banners and locations of banners may be determined.

Returning to the active video analyzer 210, the pixel data in each macroblock (i,j) may be used to generate a histogram. The active video analyzer 210 may examine a distribution of pixel data of the histogram and determine if the received video frames are locally generated by the STB 102 or from a broadcast signal. The active video analyzer 210 may create the histograms using luminance and/or color domains characteristic values.

In addition to determining the distribution of pixel data, the active video analyzer 210 may also use the histogram to detect the number of scene changes per unit time and detect the number of blank frames per unit time. The active video analyzer 210 may compare the histograms of two consecutive video frames and calculate a difference between the histograms. The difference is compared to a predetermined threshold and if the difference is greater than the predetermined threshold, the active video analyzer 210 determines a scene change occurred. Alternatively or additionally, the active video analyzer 210 may detect a blank frame by analyzing the pixel values in the histogram. If the histogram primarily contains pixel values representing a black display, the active video analyzer 210 may determine that the video frame is a blank frame. Methods for scene change detection and blank frame detection are well known to those of ordinary skill in the art and will not be further described here.

The active video analyzer 210 may also be configured to determine quality factors (e.g., measures of image quality) of the video frames. Example quality factors include, but are not limited to, an amount of blur in the video frame, a measure of blockiness in the video frame, and/or an amount of temporal jitter. The quality factors may be determined using various approaches such as standards from American National Standards Institute (ANSI), such as T1.801.01-1995 "American National Standard for Telecommunications—Digital Transport of Video Teleconferencing/Video Telephony Signals—Video Test Scenes for Subjective and Objective Performance Assessment" which is hereby incorporated herein by reference. Methods to determine the quality factors are well known to those of ordinary skill in the art and are not further described here.

The active video analyzer 210 may also be configured to analyze predetermined portions of the digital video frame and to detect the presence of predetermined images. To this end, if an image is found in the predetermined portion of the digital video frame, the image is compared to a database of images. For example, the active video analyzer 210 may examine a lower right or left portion of the video frame for a predetermined image. The predetermined image may be a logo identifying a broadcast network, such as NBC, or some other identifying image. The image is then compared to a database of logos and/or identifying images.

The vertical blanking interval analyzer 212 is configured to receive video frames from the frame buffer 206 and to determine if additional information is embedded in the vertical blanking interval of the frames. Example embedded data may be closed captioning data, V-Chip data, iTV data, and/or Nielsen Media Research Automatic Monitoring Of Line-up System (AMOL) data.

The text extractor 213 is configured to process the digital video frame and extract text characters from the digital video frame. The text extractor 213 may perform a horizontal and vertical filtering on the digital video frame to search for characteristics commonly found in text characters (e.g., horizontal, diagonal, and vertical edges). A person of ordinary skill in the art will readily appreciate that there are several different methods to extract the text characters from the digital video frame, such as using an edge detection algorithm to generate a histogram of edges. The text extractor 213 may also be configured to store the extracted text characters in a file (e.g., a bitmap) and to compare the bitmap to templates stored in the text extractor 213 to determine the source of the video signal. The templates may contain text known to be locally generated by the local device/STB 102 and may be pre-stored in the text extractor and may be updated by software.

The audio digitizer 204 is configured to receive analog or digital audio signals from the local device/STB 102. If an analog audio signal is received, the audio digitizer 204 converts the analog signal into a digital signal. The audio digitizer 204 may convert the analog audio signal into a digital representation of that signal using an analog-to-digital converter. The audio digitizer 204 may also be configured to provide signal processing capabilities to shape and/or filter the received audio signal. The audio digitizer 204 may pass digital audio signals to the audio analyzer 208 after performing signal processing such as shaping or filtering of the digital signal. If the digital audio signal is a compressed digital audio signal, it may be decompressed before the audio digitizer 204 performs any shaping or filtering of the digital signal.

The audio analyzer 208 is configured to receive digitized analog audio signals from the audio digitizer 204 and/or digital audio signals directly from the local device/STB 102. The audio analyzer 208 is also configured to analyze the energy of the audio signal (e.g., the waveform) and determine if the received audio signal is from a television broadcast signal or from the local device/STB 102 based on this analysis. The audio analyzer 208 distinguishes broadcast audio signals from audio signals generated by the local device/STB 102 based on characteristic differences in the energy of the waveforms of a broadcast audio-video signal and the waveform of an audio-video signal generated by a local device/STB 102. The audio analyzer 208 may also distinguish broadcast audio signals from audio signals generated by the local device/STB 102 by using an audio code detector to detect audio codes (e.g., codes embedded in the audio signal) that may be included in the broadcast audio signals but that are not included in audio signals generated by the local device/STB 102. The audio analyzer 208 may also be configured to detect a lack of audible components in the audio signals (e.g., silence and/or a muting of the audio signals). A person of ordinary skill in the art will readily appreciate that the silence and/or mute detection may be implemented using various techniques such as analyzing zero crossings in the audio signal, analyzing spectral energy of the audio signal, etc.

The decision module 214 is configured to receive the outputs of the active video analyzer 210, the vertical blanking interval analyzer 212, the text extractor 213, and the audio analyzer 208, and to determine the source of the received television signal (e.g., a broadcast signal or a locally generated signal). The decision module 214 may provide different weighting values to each received result and combine the weighted results. The combined weighted result may be compared to a threshold value to determine the source of the audio-video signal. The weighting values may be chosen such that the source may be determined from a single result. For example, the decision module 214 may be configured such that the source may be determined from the result of the audio analyzer 208. In this example, the weighting value associated with the result of the audio analyzer 208 is chosen such that the weighted result of the audio analyzer 208 is larger than the threshold. In an example system where the video/audio classifier is used to detect a PiP mode, the decision module 214 may be configured so that the result of the audio analyzer 208 is not used when determining the source of the received television signal.

Figure 4:
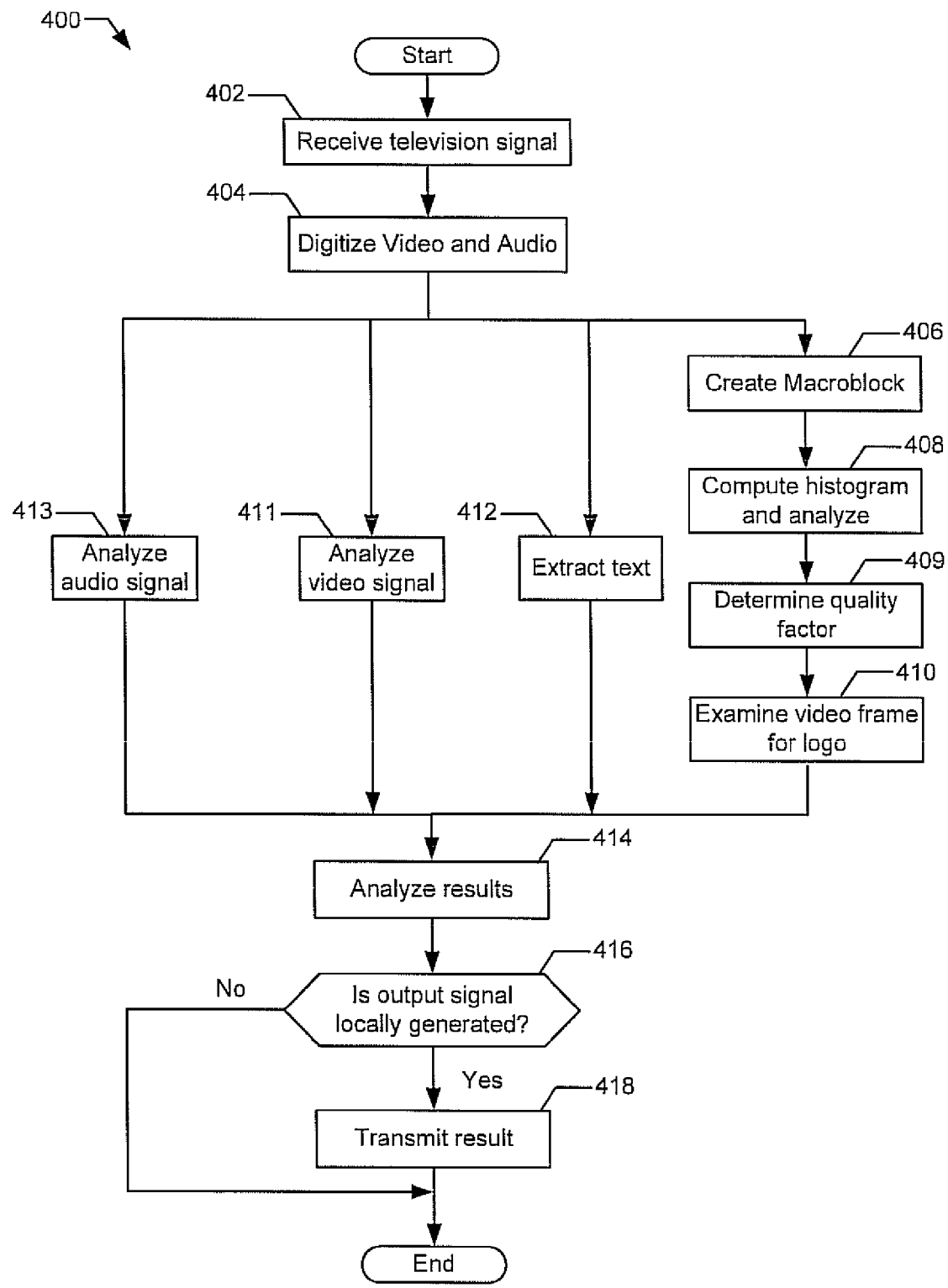
FIG. 4 is a flowchart representative of example machine readable instructions which may be executed to implement the apparatus of FIG. 2.
Figure 8:
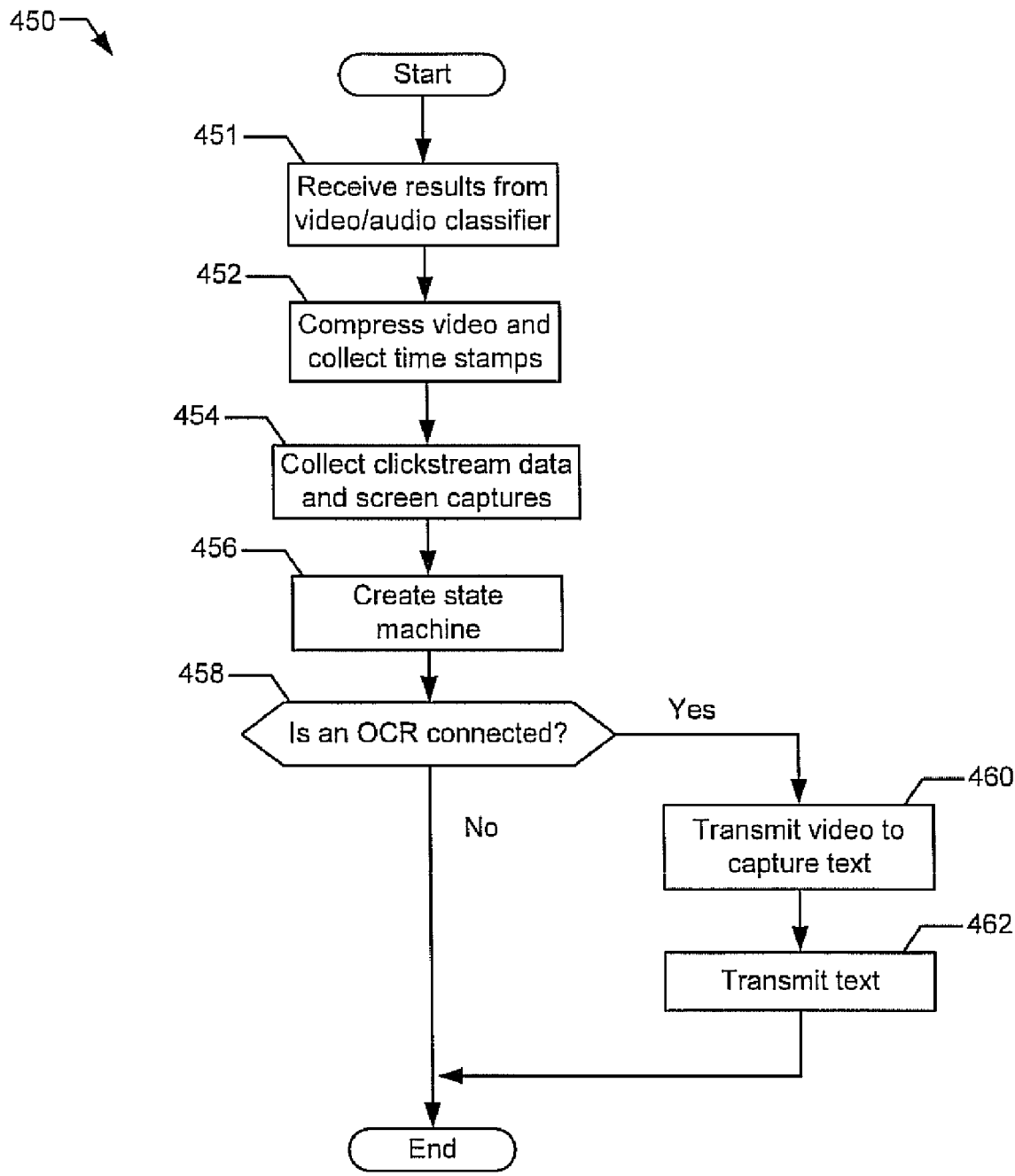
FIG. 8 is a flowchart representative of example machine readable instructions which may be executed to implement the system of FIG. 1.

FIGS. 4 and 8 are flowcharts representative of example machine readable instructions that may be executed by the apparatus of FIGS. 1 and 2 to identify the source of an audio-video signal. The processes 400 and 450 of FIGS. 4 and 8 may be implemented using one or more software programs that are stored in one or more memories (e.g., flash memory 512 and/or hard disk 520) and executed by one or more processors (e.g., processor 506) in a well known manner. However, some or all of the blocks of the illustrated processes 400 and 450 may be performed manually and/or by some other device. Although the processes 400 and 450 are described with reference to the flowcharts illustrated in FIGS. 4 and 8, a person of ordinary skill in the art will readily appreciate that many other methods of performing the processes 400 and 450 may be used. For example, the order of many of the blocks may be altered, the operation of one or more blocks may be changed, blocks may be combined, and/or blocks may be eliminated.

In general, the example process 400 of FIG. 4 begins when an audio-video signal is received. The video signal and the audio signal are digitized and represented in a digital data format. A histogram is generated from a video frame of the video signal and is analyzed to collect information regarding different aspects of the video signal such as distribution of pixel values, quality factors, scene changes and blank frames. The video signal is also analyzed to determine if there is embedded data in the video signal such as closed captioning and/or V-chip information, and to determine if text characters are in the video frame. The audio signal is also analyzed. The results of the histogram, the video signal analysis, and the audio signal analysis are combined, and the example apparatus 200 determines if the television signal is generated from the local device/STB 102 or if the television signal is a television broadcast signal.

Now turning in detail to FIG. 4, the example process 400 begins when an audio-video signal is received (block 402). The audio-video signal may be a broadcast signal or a signal that has been locally generated by, for example, the local device/STB 102. If not already separated, the audio-video signal is separated into the video signal and the audio signal.

The video signal is received by the video digitizer 202 and the audio signal is received by the audio digitizer 204 (block 404). If the video signal is an analog signal, it is converted into a digital representation (block 404). The video digitizer 202 may convert a single analog video frame and/or multiple analog video frames into digital representations of the video frames (e.g., digital video frames). The video digitizer 202 may use a frame grabber and/or an analog-to-digital converter to digitize the video frames. The digital video frames are stored in a frame buffer 206. If the video digitizer 202 receives a digital video signal, the digital video signal is passed to the frame buffer 206 without converting the digital video signal.

If the audio signal is an analog signal, it is converted into a digital audio signal (block 404). The audio digitizer 204 may use an analog-to-digital converter to convert an analog audio signal into a digital audio signal. The digital representation of the audio signal is passed to the audio analyzer 208.

After the digital representations of the video frames are stored in the frame buffer 206, the active video analyzer 210 divides a digital video frame into macroblocks (block 406). After the digital video frame is divided into macroblocks (block 406), a histogram of the macroblocks is computed (block 408). The histogram may be computed by using the average value of each macroblock's pixel values in, for example, the color (Red-Green-Blue (RGB)) domain or the luminance (hue-saturation value (HSV)) domain. Broadcast video signals typically have a larger number of colors than locally generated video signals. Therefore, the histogram of a broadcast signal will typically resemble a Gaussian noise distribution as shown in FIG. 5(a) and have a wide distribution of values. On the other hand, video generated from local devices such as the STB 102 typically have a finite color look up table (CLUT). Therefore, the histogram of a locally generated video signal will typically resemble a step function as shown in FIG. 5(b). The histogram of a locally generated video signal typically does not have a distribution of values as wide as the distribution of values of the histogram of a broadcast signal.

The active video analyzer 210 uses the histogram representation of the frame to attempt to determine the source of the audio-video signal (e.g., is the video locally generated by the STB 102 or is it a broadcast signal) (block 408). The computed histogram may be compared to a database of histograms containing histograms of STB 102 generated screen shots. To facilitate the comparison, a proxy such as a signature of the histogram developed by the active video analyzer 210 may be compared to proxies (e.g., signatures) of the histograms in the database. By examining the characteristics and differences of the histograms, the active video analyzer 210 is able to determine the source of the audio-video signal.

In addition to or instead of comparing the computed histogram to a database of histograms, the computed histogram may be analyzed to determine the number of scene changes per unit time and the number of blank video frames per unit time as described above (block 408). Locally generated video signals typically do not contain many scene changes and/or blank frames. On the other hand, a television broadcast signal typically contains scene changes and/or blank frames. Therefore, the active video analyzer 210 is able to determine the source of the audio-video signal by counting the number of scene changes per unit time and/or the number of blank video frames per unit time. The number of scene changes per unit time and the number of blank video frames per unit time are compared to predetermined thresholds to determine if the audio-video signal is a broadcast signal. If the number of scene changes and/or blank frames per unit time exceeds the predetermined thresholds, the active video analyzer may determine the source of the video signal is a broadcast signal. The predetermined thresholds may be dynamically changed or may be input by a user.

After the histograms have been computed and analyzed (block 408), the quality factors of the video frames are determined (block 409). The active video analyzer 210 may determine an amount of blur in the video frame, a measure of the blockiness of the video frame and/or an amount of temporal jitter in the video frame. Methods to calculate the quality factors are well known to those of ordinary skill in the art and are not described here. Typically, a locally generated video signal does not contain large amounts of blur, blockiness, and/or temporal jitter and the active video analyzer 210 may determine a video signal is not a locally generated video signal by comparing the values of the quality factors to predetermined thresholds.

The active video analyzer 210 also examines the video frame for known images, such as logos and/or identifiers (block 410). The active video analyzer 210 may examine specific portions/regions of the video frame for the known images, such as the corner portions of the video frame. A database of images may be stored and used as a template for comparison. If a logo and/or identifier is found in the video frame, the active video analyzer 210 may compare the logo and/or identifier to the database of images to determine if the logo and/or identifier is associated with the locally generated video signal or the broadcast signal. For example, a logo associated with a PVR such as TiVo® may be found and compared to the database of images. The active video analyzer 210 may determine the logo is associated with a PVR and then determines the audio-video signal is a locally generated signal.

The active video analyzer 210 may transmit the results of the histogram analysis, the results of the quality factor analysis and the logo analysis as separate outputs from the active video analyzer 210 to the decision module 214. Alternatively or additionally, the active video analyzer 210 may output a single result by weighting the results and combining them to determine a single output from the active video analyzer 210 similar to the decision module 214.

Figure 6:
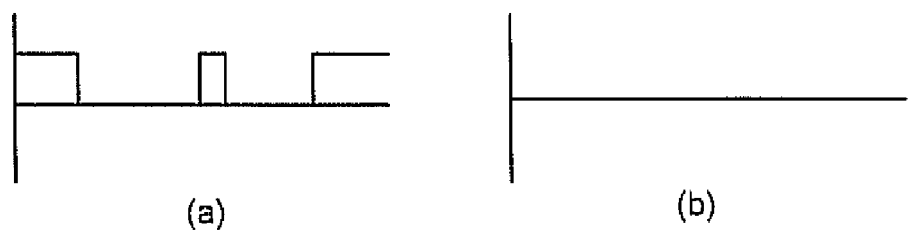
FIG. 6(a) is an illustration of example data contained in a vertical blanking interval of a television broadcast signal and FIG. 6(b) is an illustration of example data contained in a vertical blanking interval of a television signal generated by a STB.

As the active video analyzer 210 is analyzing the video frames (block 406-410), the vertical blanking interval analyzer 212 analyzes the digital video frames (block 411). The vertical blanking interval analyzer 212 attempts to detect data (e.g., closed captioning data, V-chip, iTV triggers, AMOL data, etc.) in the vertical blanking interval and the start of active video of the digital video frames. FIG. 6 illustrates two examples of the data which may be contained in the vertical blanking interval and the beginning of active video. FIG. 6(a) is an example of data that may be detected in the vertical blanking interval of a broadcast signal. FIG. 6(a) may represent digital data or a waveform. FIG. 6(b) illustrates the absence of embedded data in the television signal. Audio-video signals generated by a local device such as the STB 102 will not have data embedded in its vertical blanking interval. Thus, whereas a waveform such as that shown in FIG. 6(b) may be indicative of a locally generated video signal or a broadcast signal, a waveform such as that shown in FIG. 6(a) is very likely to be indicative of a broadcast signal.

As the active video analyzer 201 examines the digital frames for data in the vertical blanking interval (block 411), the text extractor 213 examines the digital video frames for text characters (block 412). The text extractor 213 processes the digital video frame and attempts to extract text characters from the digital video frame. Methods to extract the text characters from the digital video frame are well known to persons of ordinary skill in the art and are not described here. The text characters may be stored in a file and compared to templates stored in the text extractor 213. The templates may contain text known to be generated by the local device/STB 102. If the extracted text characters are equal to a template, the text extractor 213 may determine that the source of the video signal is likely to be a locally generated video signal.

Figure 7:
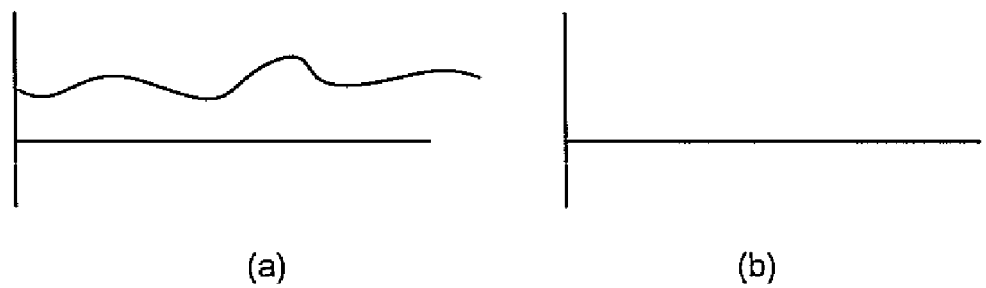
FIG. 7(a) is an illustration of example audio signal energy characteristics of a television broadcast signal and FIG. 7(b) is an illustration of example audio signal energy characteristics of a television signal generated by a STB.

As the video signal is being analyzed (blocks 406-412), the audio analyzer 208 examines the energy of the waveform of digital audio signal (block 413). FIG. 7 illustrates typical energy waveforms of the digital representations of audio signals. A television broadcast signal typically has a waveform with varying peaks and valleys as shown in FIG. 7(a). In contrast, an audio signal generated by a local device such as the STB 102 typically has a flat waveform (e.g., indicative of silence or a tone) as shown in FIG. 7(b) or may be noise. By examining the waveforms of the audio signals, the active video analyzer 210 is able to determine the source of the television signal.

The audio analyzer 208 may alternatively or additionally examine the digital audio signal for audio codes that may be embedded in the digital audio signal. A locally generated audio signal typically does not contain audio codes. Therefore, if the audio analyzer 208 detects audio codes in the digital audio signal, the audio analyzer 208 may be able to determine that the digital audio signal is a broadcast signal.

The outputs of the active video analyzer 210, the vertical blanking interval analyzer 212, the text extractor 213 and the audio analyzer 208 are then transmitted to the decision module 214 to be analyzed (block 414). The decision module 214 may provide different weighting values to each of the received results and then combine the received results to determine if the audio-video signal is locally generated by, for example, the local device/STB 102, or if the audio-video signal is a broadcast signal. The source of the audio-video signal may be determined by adding the weighted results and comparing the sum to a predetermined threshold. The weighting values and predetermined threshold may be determined by user input and/or by an adaptive software program.

If the decision module 214 determines that the audio-video signal is locally generated (block 416), the decision module 214 transmits the result and the audio-video signal to the collection unit 110, the OCR engine 108 (if present) and/or the video codec 106 (block 418). The results may be transmitted using any known communication protocol. If the decision module 214 determines that the audio-video signal is a broadcast signal, this result and any details about the broadcast source may be transmitted to the collection unit 110 and/or may be transmitted directly to a central data collection server facility and/or a backend server.

FIG. 8 is a flowchart representative of example machine readable instructions that may be executed by the apparatus of FIG. 1. The process 450 begins when the output of the video/audio classifier 104 is returned (block 451). The video signal generated by the local device/STB 102 is processed by the video codec 106. The video codec 106 may capture screen shots and compress the captured screen shots using a known compression algorithm/format (block 452). For example, the captured screen shots may be compressed using the JPG standard. The compressed screen shots are then passed to the collection unit 110. The collection unit 110 receives the compressed screen shots, associates time stamps with the compressed video (block 452), and subsequently transmits the compressed screen shots with time stamps (along with other data to identify the household from which the data was collected and/or the demographic composition of the audience) to a central data collection server and/or a backend server.

The central data collection server may decompress the screen shots, analyze the screen shots with relation to the time stamps and generate iTV click stream data (block 454). A state machine may be generated from the iTV click stream data and/or from the decompressed screen shots and accompanying time stamps (block 456). For example, if the central data collection server receives three screen shots with time stamps indicating the flow or order of the screen shots (e.g., Screen1 followed by Screen2 followed by Screen3), a state machine may be generated (e.g., State1->State2->State3). The central server may additionally or alternatively contain a predetermined state machine that matches the state machine of the device in the household. The state machine generated from the iTV click stream data may be compared to the predetermined state machine to verify that the generated state machine transitions match the predetermined state machine transitions.

Figure 9:
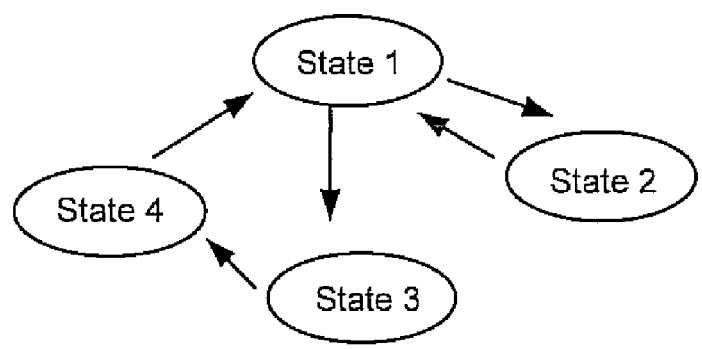
FIG. 9 is an illustration of an example state machine.

An example state machine is illustrated in FIG. 9. The example state machine has four states with various state transitions connecting each state. The example state machine indicates that a user can move between State 1 and State 2 and/or move from State 1 to State 2 to State 3 and back to State 1. For example, State 1 may represent the home screen of a digital video recorder. State 2 may represent a display of the weather forecast. According to the state machine, the user may move from the home screen to view the weather and then return home. Further, State 3 may represent a listing of available recorded media content and State 4 may represent a media program selected from the listing. Thus, the user may view the listing of available recorded media content, may select and view a media program, and then may return to the home menu when they are complete.

If an OCR engine 108 is present (block 458), the video generated by the local device/STB 102 is transmitted to the OCR engine 108 (block 460). The OCR engine 108 receives the video generated by the local device/STB 102 and extracts the on-screen text characters from the video (block 460). The extracted on-screen text characters are then transmitted to the collection unit 110 (block 462). The collection unit 110 may associate a time stamp with the received text characters and may subsequently forward the time stamped text characters (along with other data identifying the household from which the data was collected and/or demographic composition of the audience) to the central data collection server.

Figure 10:
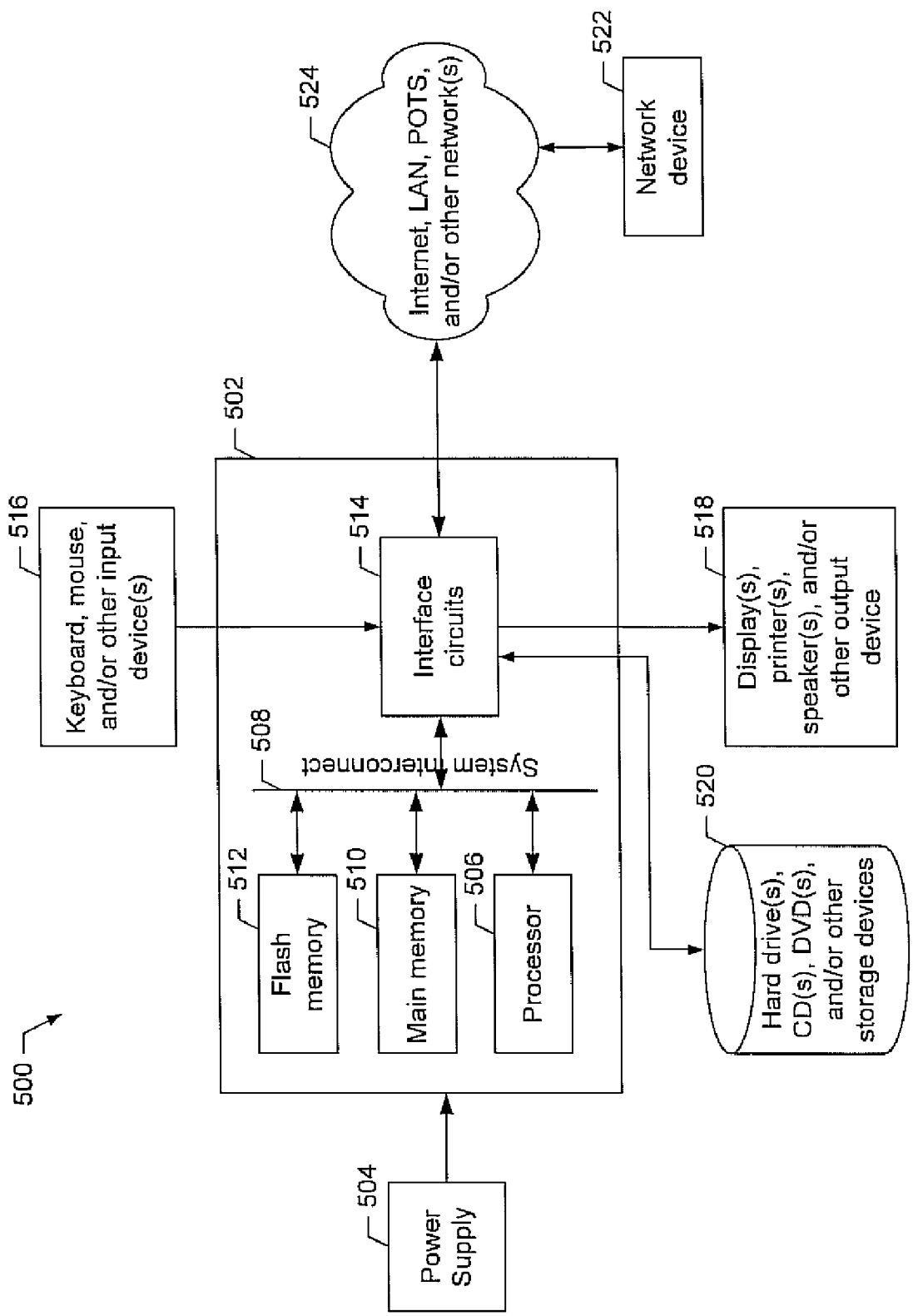
FIG. 10 is a block diagram of an example computer system that may be used to implement the apparatus of FIG. 1 and/or FIG. 2.

FIG. 10 is a block diagram of an example computer system which may execute some of all of the instructions represented by the flowcharts of FIG. 4 and/or 8 to implement some of all of the apparatus shown in FIG. 1 and/or 2. The computer system 500 may be a personal computer (PC) or any other computing device. In the example illustrated, the computer system 500 includes a main processing unit 502 powered by a power supply 504. The main processing unit 502 may include a processor 506 electrically coupled by a system interconnect 508 to a main memory device 510, a flash memory device 512, and one or more interface circuits 514. In an example, the system interconnect 508 is an address/data bus. Of course, a person of ordinary skill in the art will readily appreciate that interconnects other than busses may be used to connect the processor 506 to the other devices 510-514. For example, one or more dedicated lines and/or a crossbar may be used to connect the processor 506 to the other devices 510-514.

The processor 506 may be any type of well known processor, such as a processor from the Intel Pentium® family of microprocessors, the Intel Itanium® family of microprocessors, the Intel Centrino® family of microprocessors, and/or the Intel XScale® family of microprocessors. The processor 506 also may be a Digital Signal Processor (DSP) or other processor optimized for signal processing functions and/or applications. In addition, the processor 506 may include any type of well known cache memory, such as static random access memory (SRAM). The main memory device 510 may include dynamic random access memory (DRAM) and/or any other form of random access memory. For example, the main memory device 510 may include double data rate random access memory (DDRAM). The main memory device 510 may also include non-volatile memory. In an example, the main memory device 510 stores a software program which is executed by the processor 506 in a well known manner. The flash memory device 512 may be any type of flash memory device. The flash memory device 512 may store firmware used to boot the computer system 500.

The interface circuit(s) 514 may be implemented using any type of well known interface standard, such as an Ethernet interface and/or a Universal Serial Bus (USB) interface. One or more input devices 516 may be connected to the interface circuits 514 for entering data and commands into the main processing unit 502. For example, an input device 516 may be a keyboard, mouse, touch screen, track pad, track ball, isopoint, and/or a voice recognition system.

One or more displays, printers, speakers, and/or other output devices 5108 may also be connected to the main processing unit 502 via one or more of the interface circuits 514. The display 518 may be a cathode ray tube (CRT), a liquid crystal displays (LCD), or any other type of display. The display 518 may generate visual indications of data generated during operation of the main processing unit 502.

The computer system 500 may also include one or more storage devices 520. For example, the computer system 500 may include one or more hard drives, a compact disk (CD) drive, a digital versatile disk drive (DVD), and/or other computer media input/output (I/O) devices.

The computer system 500 may also exchange data with other devices 522 via a connection to a network 524. The network connection may be any type of network connection, such as an Ethernet connection, digital subscriber line (DSL), telephone line, coaxial cable, etc. The network 524 may be any type of network, such as the Internet, a telephone network, a cable network, and/or a wireless network. The network devices 522 may be any type of network devices 522. For example, the network device 522 may be a client, a server, a hard drive, etc.

From the foregoing, persons of ordinary skill in the art will appreciate that in addition to monitoring the programming broadcast to and processed by a local device such as a STB, the disclosed examples enable monitoring the video generated by the local device (e.g., menus, iTV, etc.) The video generated by the local device may be monitored to detect a PiP mode, to detect changing channels, to measure personal video recorder (PVR) usage, measure iTV usage, and to generate click stream data (e.g., on-screen items the user selects or clicks on).

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method of distinguishing an audio-video signal originating from a local device from a broadcast signal, the method comprising:
    classifying a video component of the audio-video signal by at least one of analyzing a histogram of pixel data, analyzing a quality factor, or attempting to detect embedded data in the video component;
    classifying an audio component of the audio-video signal by at least one of attempting to detect embedded audio data or analyzing waveform energy associated with the audio component; and
    determining a source of the audio-video signal based on at least one of the video classification or the audio classification, wherein determining the source of the audio-video component comprises combining values associated with the video classification with values associated with the audio classification.

2. A method of distinguishing an audio-video signal originating from a local device from a broadcast signal, the method comprising:
    classifying a video component of the audio-video signal by at least one of analyzing a histogram of pixel data, analyzing a quality factor, or attempting to detect embedded data in the video component;
    classifying an audio component of the audio-video signal by at least one of attempting to detect embedded audio data or analyzing waveform energy associated with the audio component; and
    determining a source of the audio-video signal based on at least one of the video classification or the audio classification, wherein determining the source of the audio-video signal comprises:
    applying weighting values to the video classification and the audio classification;
    combining the weighted video classification and the weighted audio classification to create a combined result; and comparing the combined result to a predetermined threshold.

3. An apparatus for distinguishing an audio-video signal originating from a local device from a broadcast signal, the apparatus comprising:

at least two of:
(a) an active video analyzer to classify a video component of the audio-video signal by at least one of analyzing a histogram of pixel data or analyzing a quality factor;
(b) a vertical blanking interval analyzer to classify the video component of the audio-video signal by attempting to detect embedded video data;
(c) a text extractor to at least one of detect text characters in the video component of the audio-video signal or extract text characters in the video component of the audio-video signal; and
(d) an audio analyzer to classify an audio component of the audio-video signal by at least one of detecting embedded audio data or analyzing an audio waveform's energy; and
a decision module to determine a source of the audio-video signal based on outputs of the at least two of the active video analyzer, the vertical blanking interval analyzer, the text extractor, and the audio analyzer, wherein the vertical blanking interval analyzer is configured to detect at least one of closed captioning data, interactive television triggers, or metering data.

4. An apparatus for distinguishing an audio-video signal originating from a local device from a broadcast signal, the apparatus comprising:

at least two of:
(a) an active video analyzer to classify a video component of the audio-video signal by at least one of analyzing a histogram of pixel data or analyzing a quality factor;
(b) a vertical blanking interval analyzer to classify the video component of the audio-video signal by attempting to detect embedded video data;
(c) a text extractor to at least one of detect text characters in the video component of the audio-video signal or extract text characters in the video component of the audio-video signal; and
(d) an audio analyzer to classify an audio component of the audio-video signal by at least one of detecting embedded audio data or analyzing an audio waveform's energy; and
a decision module to determine a source of the audio-video signal based on outputs of the at least two of the active video analyzer, the vertical blanking interval analyzer, the text extractor, and the audio analyzer, wherein the text extractor is configured to compare extracted text characters to known text characters.

5. An apparatus for distinguishing an audio-video signal originating from a local device from a broadcast signal, the apparatus comprising:

at least two of:
(a) an active video analyzer to classify a video component of the audio-video signal by at least one of analyzing a histogram of pixel data or analyzing a quality factor;
(b) a vertical blanking interval analyzer to classify the video component of the audio-video signal by attempting to detect embedded video data;
(c) a text extractor to at least one of detect text characters in the video component of the audio-video signal or extract text characters in the video component of the audio-video signal; and
(d) an audio analyzer to classify an audio component of the audio-video signal by at least one of detecting embedded audio data or analyzing an audio waveform's energy; and
a decision module to determine a source of the audio-video signal based on outputs of the at least two of the active video analyzer, the vertical blanking interval analyzer, the text extractor, and the audio analyzer, wherein the decision module is configured to:

assign a weighting value to each received output;

combine the weighted output values to form a combined value; and compare the combined value to a predetermined threshold to determine the source of the signal.

* * * * *